United States Patent [19]

Breeden et al.

[11] Patent Number: 5,109,220

[45] Date of Patent: Apr. 28, 1992

[54] SELECTIVE CALL CONTROLLER

[75] Inventors: Robert L. Breeden, Boynton Beach; Victor Jensen, Boca Raton; Craig S. Wallace, Boynton Beach, all of Fla.

[73] Assignee: Motorola, Inc., Schaumburg, Ill.

[21] Appl. No.: 323,657

[22] Filed: Mar. 15, 1989

[51] Int. Cl.$^5$ .............................................. H04B 7/00
[52] U.S. Cl. ................................ 340/825.480; 379/56; 379/57
[58] Field of Search ..................... 340/825.44, 825.47, 340/825.48, 311.1; 379/56, 57, 105, 386, 93, 98; 390/94.1; 455/31, 32, 35, 36, 38

[56] References Cited

U.S. PATENT DOCUMENTS

| | | | |
|---|---|---|---|
| 4,103,107 | 7/1978 | D'Amico et al. | 340/825.48 |
| 4,145,684 | 3/1979 | Stodolski | 340/825.48 |
| 4,336,524 | 6/1982 | Levine | 379/57 |
| 4,403,212 | 9/1983 | Masaki | 340/825.48 |
| 4,438,435 | 3/1984 | Smoot et al. | 455/31 |
| 4,563,680 | 1/1986 | Nakajima | 340/311.1 |
| 4,642,632 | 2/1987 | Ohyagi et al. | 455/38 |
| 4,742,516 | 5/1988 | Yamaguchi | 340/825.44 |
| 4,868,872 | 9/1989 | Roberts et al. | 340/825.40 |
| 4,926,460 | 5/1990 | Gutman et al. | 340/825.48 |

FOREIGN PATENT DOCUMENTS

| | | | |
|---|---|---|---|
| 0189089 | 7/1986 | European Pat. Off. | 340/825.44 |
| 2177244 | 1/1987 | United Kingdom | 340/825.48 |
| 2208777 | 4/1989 | United Kingdom | 340/825.48 |

Primary Examiner—Donald J. Yusko
Assistant Examiner—Dervis Magistre
Attorney, Agent, or Firm—Daniel R. Collopy; Vincent B. Ingrassia; William E. Koch

[57] ABSTRACT

A selective call controller, such as a paging terminal, and a method therefor is provided for receiving calls comprising first and second types of signal, such as numeric/alphanumeric or modem/DTMF. A determination is made of the type of signal being received, and a destination address and message signal is selected accordingly.

15 Claims, 2 Drawing Sheets

| PAGER NO. | MODE | PAGER ADDRESS |
|---|---|---|
| 400 | 0 | Numeric data address |
|  | 1 | Alphanumeric data address |
| 401 | 0 |  |
|  | 1 |  |
| 402 | 0 |  |
|  | 1 |  |
| 403 | 0 |  |
|  | 1 |  |

*FIG.3*

SELECTIVE CALL CONTROLLER

BACKGROUND OF THE INVENTION

This invention relates to a selective call controller, such as a paging terminal, having means for receiving calls comprising first and second different types of signal, such as DTMF modulated numeric data and modem modulated alphanumeric data. The invention relates to the controller and a method of operation thereof for directing one type of signal to one pager address and the other type to another pager address.

SUMMARY OF THE PRIOR ART

The use of different pager address associated with different data encoding formats is well known. For example, in the Motorola PMR2000 pager it is possible to associate one address with a full alphanumeric encoding format for transmitting alphanumeric messages, while another address is associated with a "shorthand" (and therefore faster) encoding format for transmitting numeric messages. To date, the only means of selecting the appropriate format has been the use of two different pager numbers—one for the alphanumeric format and the other for the numeric format. This use of two different pager numbers places an undue burden upon the person placing the page, because this person must now remember two different pager numbers and must use the one which is appropriate for the type of message to be sent, or he must otherwise make an entry identifying the type of data being entered.

It would be desirable to provide a paging system which enabled first and second different types of signals to be received and to be transmitted to different selective call receiver addresses depending on the type of signal, without the need for the operator placing the call to take any steps to identify the type of signal.

SUMMARY OF THE INVENTION

According to the invention, a selective call controller is provided comprising:
  means for receiving calls comprising first and second different types of signal;
  transmitting means for transmitting said calls to one or more selective call receivers having at least two destination addresses;
  means for determining whether a received call comprises said first or second type of signal; and
  means for determining the destination address of said received call according to the determined signal type thereof, whereby the call may be sent to that destination address.

The first and second types of signal may be numeric and alphanumeric data, or they may be DTMF and modem modulated signals. In either case, a selective call receiver may be provided having a first address for receiving numeric data and a second address for receiving alphanumeric data and the data may be sent to the appropriate address.

More generally, the first and second types of signal may be any two of: numeric data, alphanumeric data, voice and tone-only signals. Current PMR pagers of Motorola have addresses for these four types of signal.

In this manner, the invention provides an automatic means, within the selective call controller, of selecting the appropriate selective call receiver address based upon intelligent processing of information about the call. As well as selecting the appropriate pager address, the same information can be used to select the appropriate message encoding format.

In a first aspect of the invention, information concerning the source of the call is used. For example, if the source of the message is DTMF telephone signals or other numeric-only devices, then the numeric address and format are selected. If the source is a video display terminal, a page entry terminal, a computer-to-computer link, telex or other full alphanumeric device, then the alphanumeric address and format are selected. In a first embodiment of this aspect of the invention, the controller has means for testing whether the type of signal is a first type, timer means are provided for timing a time-out period during which said test is carried out, and means are provided for switching the controller from the first signal type receive mode to a second signal type receive mode after said time-out period if the test determines that the call does not comprise said first type of signal.

In a second embodiment of the first aspect of the invention, the first type of signal comprises tone signals indicative of the digits 0-9 plus at least one other tone signal and means are provided in the controller for detecting said other tone signal and for switching from DTMF receive mode to a receive mode for receiving the other signal type upon such detection.

In a third embodiment of the first aspect of the invention, means are provided for receiving a signal of the first type, said signal having an indication (e.g. an unused receiver address) that it will subsequently be of a second type, means are provided for identifying said indication, and means are provided for switching the controller from a first signal type receive mode to a second signal type receive mode upon such identification. In this embodiment, the controller can be considered as having a default, or stand-by receive mode in which it receives signals of the first type, and only switches to the other receive mode if a command to do so is received.

In a second aspect of the invention, the message sent is used to select the appropriate address. In one embodiment of this aspect of the invention, means are provided in the controller for inspecting the content of a call and determining that the signal type is alphanumeric if one or more alphabetic characters are present, and otherwise determining that the type is numeric. This aspect of the invention is slightly more complex, but is more thorough.

The invention provides the advantage that no messagedependant action is required on the part of the person placing the call. A single pager number is used regardless of the message source and content, and all decisions necessary for optimum transmission efficiency are made automatically by the paging controller, and are transparent to the caller. Preferred embodiments of the invention will now be described by way of example, with reference to the accompanying drawing.

BRIEF DESCRIPTION OF THE DRAWING

FIG. 3 shows the look-up table of FIG. 2.

DETAILED DESCRIPTION OF THE INVENTION

Figure 1:
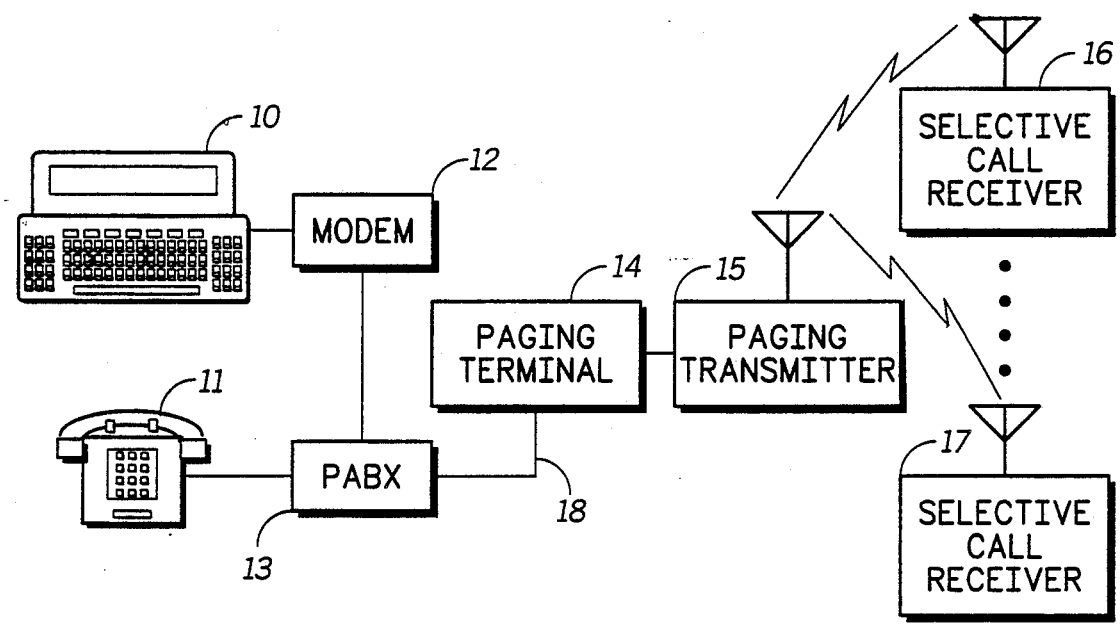
FIG. 1 shows a paging system incorporating a controller in accordance with the invention.

Referring to FIG. 1, a paging system in accordance with a preferred embodiment of the invention is shown, comprising input devices in the form of a computer terminal 10 and a telephone 11, a modem 12, a private branch exchange (PABX) 13, a paging terminal 14, a paging transmitter 15 and paging receivers 16 and 17. The terminal 10 is connected to the PABX by means of the modem 12, while the telephone 11 connects directly into the PABX. The telephone 11 could be of the pulse-dial type, but for the purposes of the present description, it will be considered as a dual-tone multi-frequency (DTMF) telephone. The modem 12 includes an autodialer which will also be considered as DTMF type. The PABX 13 directs calls from the input devices to the terminal 14 along a telephone line 18. The transmitter 15 and the receivers 16 and 17 are standard in the art. The receivers 16 and 17 may, for example, be PMR2000 pagers manufactured by Motorola Inc. These pagers have separate paging addresses for numeric and alphanumeric data.

Figure 2:
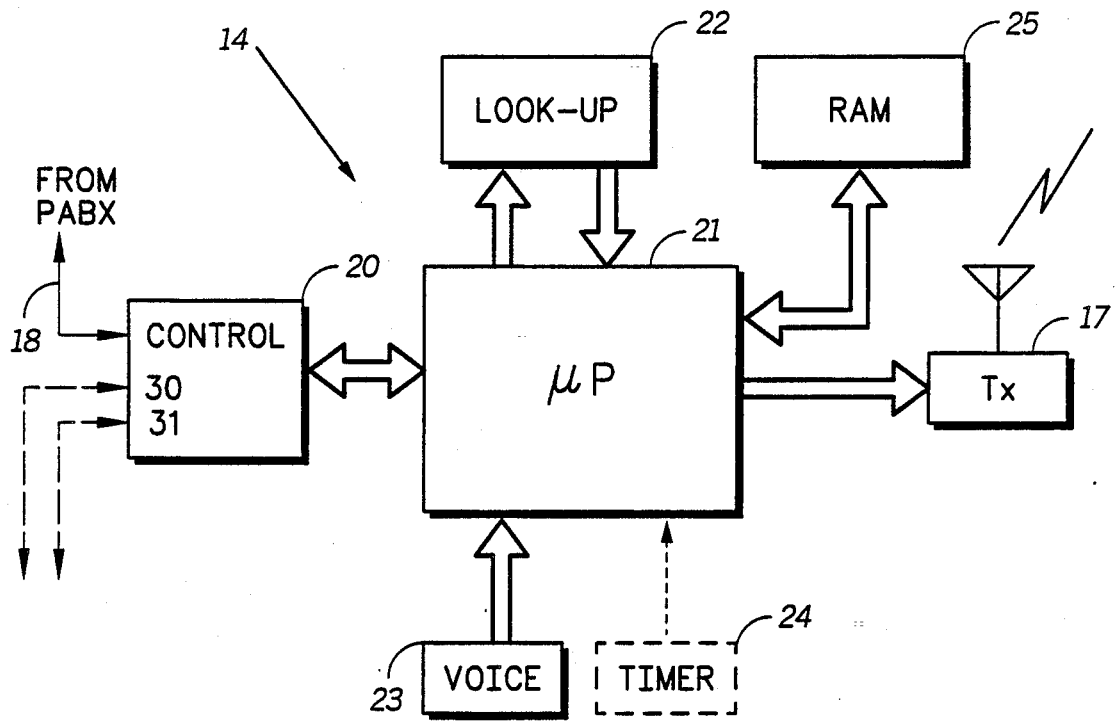
FIG. 2 shows details of the terminal of FIG. 1.

FIG. 2 shows the terminal 14 in greater detail, showing that the terminal comprises a controller and supervisor 20, a microprocessor 21, a database memory including a look-up table 22, synthesized voice data 23 and optional timer information 24, and also comprises the transmitter 17.

In a first preferred embodiment of the invention, the terminal 14 operates on a "default" mode in which the controller and supervisor 20 receives and decodes DTMF signals. If, after a time-out period, the controller and supervisor 20 does not receive any DTMF signal, it switches to a modem receive mode. In this embodiment, the terminal operates as follows:

In the case where a paging call is to be placed through telephone 11, an operator lifts the handset and dials a predetermined number (e.g. 123) identifying the paging terminal 14. The PABX 13 routes the call through to line 18. When the call is routed to terminal 14, controller and supervisor 20 recognize that a call is being received and issues a prompt as follows. Microprocessor 21 retrieves the synthesized voice information from memory portion 23 and passes a synthesized voice message to controller and supervisor 20, which is communicated back to telephone 11, requesting the operator to enter the number of the paging receiver to be called. As soon as this message is finished, the microprocessor 21 reads a predetermined time-out period from timer 24 and commences to count up to this period. Provided the operator dials at least one further digit within the time-out period, the controller and supervisor 20 recognizes the DTMF tone pair received and at this point sets a mode indicator in microprocessor 21 recording that the call being received is in DTMF form and is therefore purely numeric. The timer 24 has no further effect once the tone pair has been received within the time-out period. When the operator has dialed the complete paging receiver number, the microprocessor 21 performs a look-up operation in look-up table 22 of FIG. 3.

In FIG. 3 the look-up table 22 is shown as containing a series of pager numbers (400-403 etc.), a mode indicator and various pager addresses. Each of the pagers 16 and 17 is allocated a pager number, e.g. numbers 400 and 401 respectively. If the operator has dialed 400, the microprocessor looks up pager number 400, mode 0 and reads the numerical data address for pager 16. The terminal 14 then transmits a paging message to pager 16 in a manner standard in the art. More specifically, the terminal 14 (controller) transits a page comprising one of a first or a second type of data that is selected from a group consisting of alphanumeric data, numeric data, voice and tone only signals.

When a paging call is to be placed from terminal 10 the autodialer in modem 12 dials the predetermined number (123) of the PABX 13. In the same manner as before, the call is routed to line 18 and the controller and supervisor 20 recognizes that a call is being received, and issues the same prompt as before. In this case, no further DTMF tone pairs are issued by the autodialer 12, but instead the modem issues its carrier signal. At the end of the timeout period determined by timer 24, the microprocessor 21 instructs the controller and supervisor 20 to switch to modem receive mode. Upon switching to this mode, controller and supervisor 20 issues a carrier signal in response, which is received by modem 12. At the same time as making this response, the microprocessor 21 sets the mode indicator at 1, thereby registering that the incoming paging call is being made via a modem link and may therefore include not only numeric data, but alphabetic data. The modem 12 responds to the carrier signal from controller and supervisor 20, and a modem connection is established. At this point, microprocessor 21 issues a prompt which appears on the screen of terminal 10 as a request for the paging receiver number. The operator then types in the paging receiver number required, e.g. 400, this is passed by the controller and supervisor 20 to the microprocessor 21, a further prompt for additional display data is issued to the terminal 10, and further display data may be typed in. To make the call, microprocessor 21 performs the same look-up operation, but this time the mode indicator is different, so that it is the alphanumeric data address of pager 16 that is retrieved from look-up table 22. The terminal 14 then pages pager 22 in a manner standard in the art and sends the additional data to the paging receiver 16.

In the above description, line level dialing has been described. As an alternative, trunk level dialing can be used, in which the operator dials in the paging terminal number immediately followed by the paging receiving number (e.g. 123400) or in the case of the computer terminal 10, the operator types in the entire number before the modem 12 dials that number using its autodial facilities. In the case of trunk level access, the terminal 14 does not need to prompt the operator to enter the pager number, but instead prompts for further display data (which may simply be an answer back telephone number). In this case, the time-out period begins at the end of the prompt for additional display data.

Other arrangements within the scope of the first embodiment of the invention may be considered. For example the default mode may be modem receive mode, though this would have the disadvantage that a telephone caller would receive modem carrier through the telephone earpiece during the time-out period.

In a second preferred embodiment of the invention, no time-out period is used, but instead the autodialer of modem 12 is programmed to dial a particular tone signal other than the tone signals indicative of the digits 0-9.

DTMF telephones are capable of generating tone pairs corresponding to the digits 0-9, and in addition they are capable of dialing at least two other tone pairs (usually indicated as * and #) Since these additional symbols are not required by the telephone 11, they can be used by the autodialer of modem 12 so that the controller and supervisor 20 recognizes one of those signals as indicating modem access mode. The operation of the system is as follows. If the call is placed via the telephone 11, this is routed to terminal 14, and controller and supervisor 20 identifies that a call is being received, fails to identify the predetermined symbol (e.g. *) and sets the modem indicator at 0, registering that the call is being received from a DTMF telephone. If, on the other hand, an operator places a call through terminal 10, the autodialer of modem 12 dials the same number for the PABX (123) call (or for trunk level access, dials the entire number including the paging receiver number), and (in either case) the autodialer 12 follows that number (after an appropriate delay) with the DTMF tone pair for the symbol *. The controller and supervisor 20 recognizes this additional tone pair and sets the mode indicator at 1, indicating that the call is being received from a modem link. At the same time, the controller and supervisor 20 switches to modem access mode and issues a modem carrier signal, which is received by the modem 12 and a modem link is thereby established. The remaining functions of the system are the same as previously described.

In a third embodiment of the invention, instead of using a "spare" DTMF character, a spare pager address is used. In this embodiment, DTMF is the default mode and an initial pager address is generated by the operator of a telephone receiver 11, as above, or by an autodialer associated with the modem 12. In this embodiment, the autodialer dials a predetermined pager address which is recognized by the controller and supervisor 20 as indicating modem access mode. On receipt of this address, the controller and supervisor 20 switches to modem access mode and sets the mode indicator to 1. A modem connection is then established and the pager and supervisor 20 issues a prompt which appears on the screen of the terminal 10 as a request for a (real) pager address. Thereafter, the paging operation is continued as described above. A pager address dialed by the operator of the telephone 11 is treated as described above.

The person skilled in the art will appreciate that other indications, instead of *, # or a spare pager address, can be included in one or other signal to indicate that the signal type will subsequently change to the other signal type.

In a preferred embodiment according to a fourth aspect of the invention, the controller and supervisor 20 has more than one input port, e.g. it has ports 30 and 31. Port 30 is connected to one or more modems in the system and port 31 is connected to one or mode DTMF telephones. When a call is received via port 30, the controller and supervisor 20 informs the microprocessor 21 that this is the case, and the mode indicator is set at 1. Conversely, when a call is received via port 31, the mode indicator is set at 0. As well as serving to set the mode indicator, the controller and supervisor 20 determines whether to operate in modem access mode or DTMF mode according to the port at which a call is received.

A preferred embodiment of the invention, in accordance with a second aspect thereof will now be described, in which the actual content of a call is inspected for alphabetic characters, and if no alphabetic characters are found, the call is transmitted in numeric format, otherwise being transmitted in alphanumeric format. By way of description it will be assumed that call has been placed via a computer terminal 10 and the pager number and additional display data have been input and received by the terminal 14. This aspect of the invention is most useful in distinguishing between (on the one hand) alphanumeric data and (on the other hand) numeric data which has been received from a source which is capable of providing alphanumeric data. The case of a source, such as telephone 11, which is capable only of providing numeric data will not be considered in the description that follows.

Let it be assumed that a call is placed and received by the terminal 14 in a manner standard in the art. The substance of the call is stored in memory 25 in the form of ASCII characters. When the entire message has been received and stored (or as it is being received), the microprocessor 21 determines whether it contains any alphabetic characters. This can be carried out in a number of manners, one of which is to look for a bit of the ASCII binary equivalent forms which distinguishes numeric and alphabetic data. In hexadecimal terms, the ASCII codes for the digits 1 to 9 are #30 to #39, while the characters of the alphabetic (A to Z) are #41 to #5a, (or #61 to #7a lower case). From this, it can readily be seen that for an alphabetic character, the second bit of the 8-bit binary word is 1, whereas for a numeric digit, this is 0. If the microprocessor 21 fails to find a 1 in this position anywhere in the message, it determines that the message is purely numeric and it sets the mode indicator at 0, looks up the numeric data address in look-up table 22, and transmits the entire message in numeric data format to that address. If even a single alphabetic character is found in the message, the mode indicator is set at 1, the alphanumeric data address is looked up and the entire message is sent in its ASCII form to the alphanumeric data address of the paging receiver.

When one of the first and second types of signal is voice, this can be detected too and sent to the appropriate pager address. This can be done by monitoring the line 18 for audio modulations above a certain threshold, while at the same time monitoring for DTMF (or pulse-dial) tones. During this monitoring, the signal on the line must be stored in digitized form. If audio modulations are detected, the whole message is recorded and transmitted to the voice address. If DTMF (or pulse dial) tones are detected, the corresponding numeric data is sent to the numeric address.

What is claimed is:
1. A selective call controller comprising:
   means for receiving calls comprising a pager number coupled to a first or second type of message signal;
   transmitting means for transmitting said calls to one or more selective call receivers corresponding to said pager number, the selective call receivers having at least two pager addresses corresponding to said two types of message signal;
   means coupled to said receiving means for determining whether a received call comprises said first or second type of message signal; and
   means coupled to said determining means and said transmitting means for selecting the pager address of said received call according to the determined message signal type thereof, whereby the call may be sent to that pager address.
2. The controller according to claim 1, wherein means are provided for testing whether the type of message signal is a first type wherein timer means are provided for timing a time-out period during which said test is carried out, and wherein means are provided for switching the controller from a first message signal type receive mode to a second message signal type receive mode after said time-out period if the test determines that the call does not comprise said first type of message signal.

3. The controller of claim 2, wherein the types of message signal are DTMF and modem modulated signals.

4. The controller of claim 1, wherein the first type of signal comprises tone signals indicative of the digits 0 to 9 plus at least one other tone signal and wherein means are provided in the controller for detecting said other tone signal and for switching from DTMF receive mode to a receive mode for receiving the other message signal type upon such detection.

5. The controller of claim 1, further comprising means for receiving a message signal of said first type, said message signal having an indication that it will subsequently be of the second type, means for identifying said indication and means for switching the controller from a first message signal type receive mode to a second message signal type receive mode upon such identification.

6. The controller of claim 5, wherein said indication comprises an unused receiver address.

7. The controller of claim 5, in combination with a call generating device adapted to generate calls comprising said second message signal type preceded by message signals of said first type including said indication.

8. The controller of claim 1, wherein said means for receiving calls comprises separate ports for receiving calls comprising said first and second types of message signal and wherein said message signal type determining means determines at which of said ports a call is received.

9. The controller of claim 1, wherein the first and second types of message signal comprise numeric and alphanumeric data respectively.

10. The controller of claim 9, wherein said message signal type determining means comprises means for inspecting the content of a call and determining that the type of message signal is alphanumeric if one or more alphabetic characters are present, and otherwise determining that the type is numeric.

11. The controller of claim 1 in combination with a selective call receiver having a first address for receiving message signals of said first type and a second address for receiving message signals of said second type.

12. The controller and receiver of claim 11, wherein the first and second types of message signal are selected from a group consisting of alphanumeric data, numeric data, voice and tone-only signals.

13. A method of operating a selective call system having first and second types of message generating devices operating with different types of message signal transmission format, the method comprising the steps of:
   receiving a message signal for transmission to a selective call receiver;
   determining which of said different types of format said message signal has; and
   selecting a pager address of a message with the message signal according to the determined format of the message signal, whereby the message may be sent to a destination corresponding to said pager address.

14. A paging terminal, comprising:
   call input means for receiving a paging call having a pager number coupled to message data including at least numeric or alphanumeric data;
   transmitting means coupled to the call input means for transmitting a numeric data page to a first pager address and for transmitting an alphanumeric data page to a second pager address, the first and second pager addresses corresponding to the pager number; and
   control means, coupled to the call input means and to the transmitting means, for determining from the received message data whether to transmit the numeric data page to the first pager address or to transmit the alphanumeric data page to the second pager address.

15. The paging terminal of claim 14, wherein the control means includes means for inspecting the received message data and determining to transmit the alphanumeric data page if one or more alphanumeric data characters are present in the received message data, and otherwise determining to transmit the numeric data page.

* * * * *

UNITED STATES PATENT AND TRADEMARK OFFICE
CERTIFICATE OF CORRECTION

PATENT NO. : 5,109,220

DATED : April 28, 1992

INVENTOR(S) : Breeden et al.

It is certified that error appears in the above-identified patent and that said Letters Patent is hereby corrected as shown below:

Col. 7, line 10, "signal" should be --signals--.

Column 7, line 9, after "modulated" insert --message--.

Column 7, line 13, before "signal" insert --message--.

Signed and Sealed this

Eleventh Day of May, 1993

Attest:

MICHAEL K. KIRK

*Attesting Officer*    *Acting Commissioner of Patents and Trademarks*

UNITED STATES PATENT AND TRADEMARK OFFICE
CERTIFICATE OF CORRECTION

PATENT NO. :   5,109,220
DATED      :   April 28, 1992
INVENTOR(S) :  Breeden et al.

It is certified that error appears in the above-identified patent and that said Letters Patent is hereby corrected as shown below:

Column 7, line 9, after "signal" delete "are" and insert --comprise--.

Signed and Sealed this

Thirtieth Day of November, 1993

Attest:

BRUCE LEHMAN

Attesting Officer

Commissioner of Patents and Trademarks